Patented Sept. 6, 1932

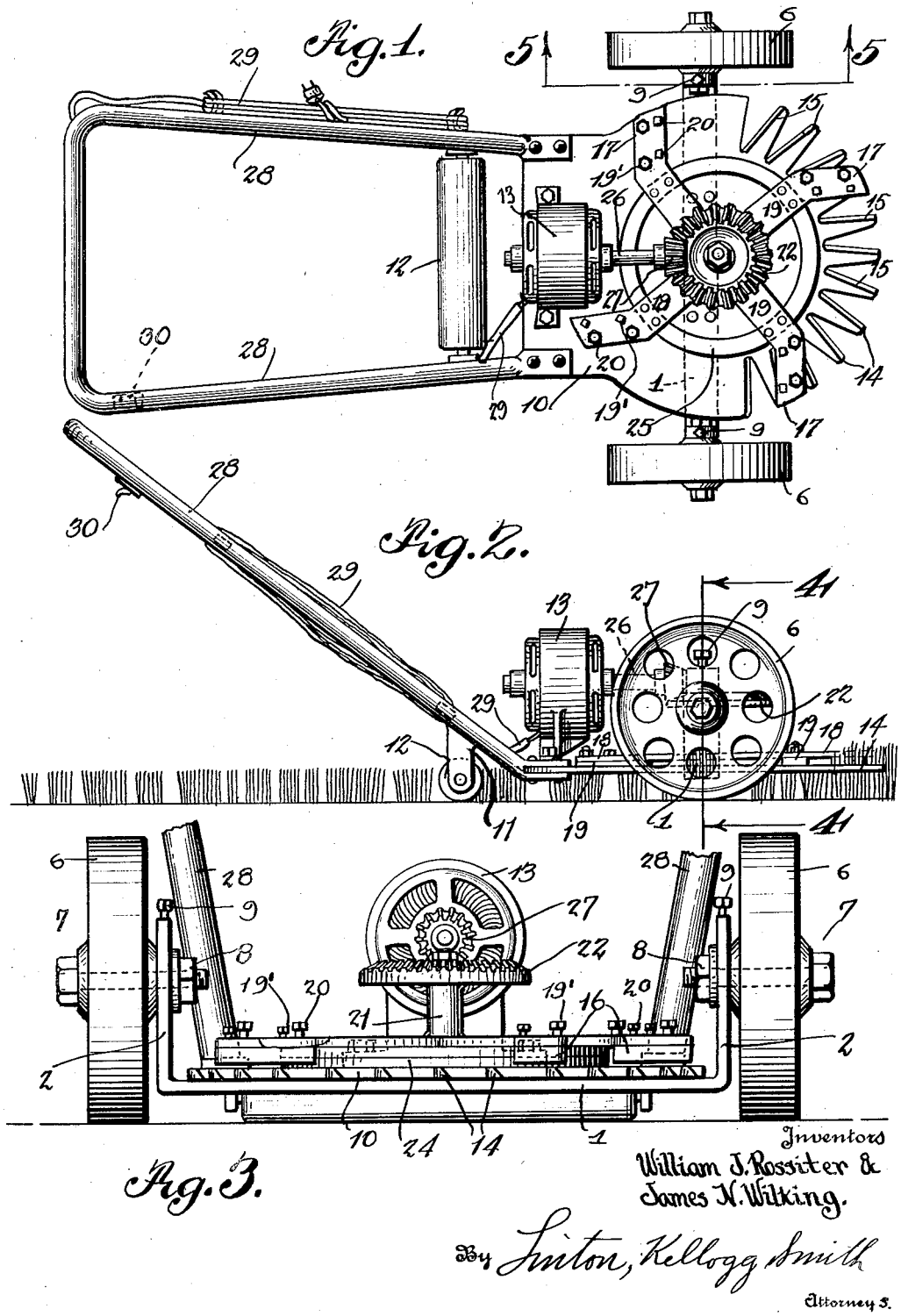

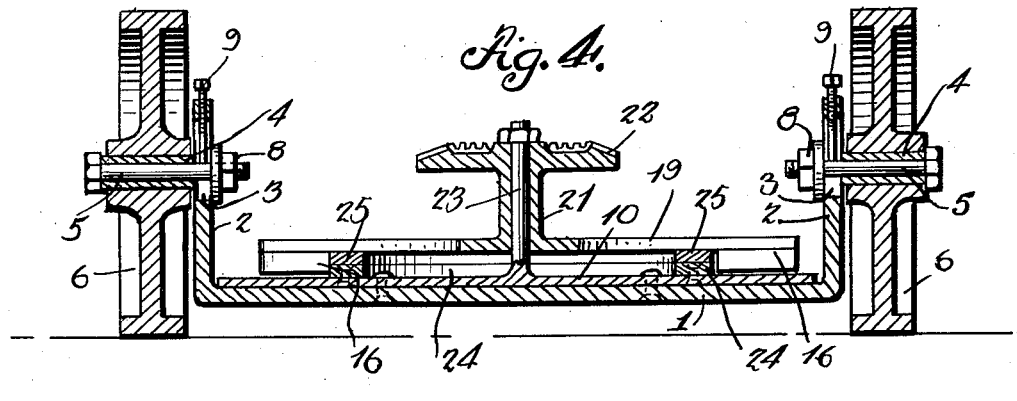
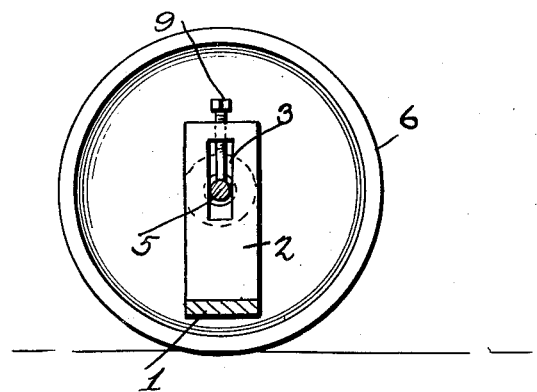
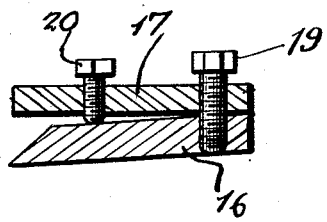
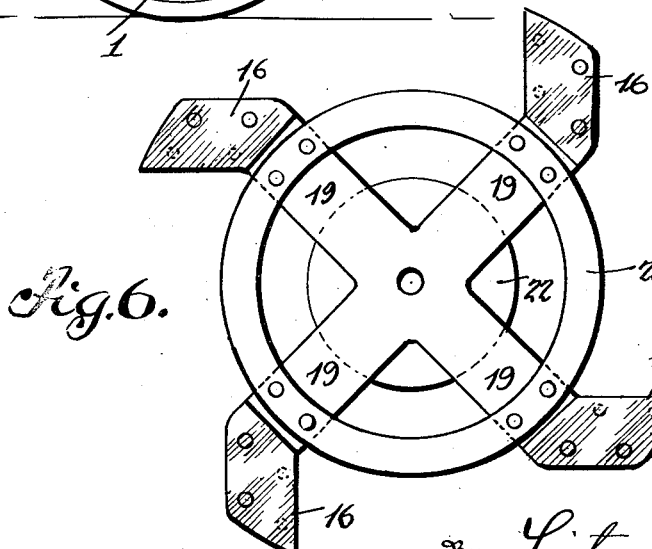

1,876,504

UNITED STATES PATENT OFFICE

WILLIAM J. ROSSITER AND JAMES N. WILKING, OF BIRMINGHAM, ALABAMA

POWER DRIVEN ROTARY MOWER

Application filed February 1, 1930, Serial No. 425,241. Renewed July 9, 1932.

The present invention relates to lawn mowers and more especially, to the motor driven type, which employ stationary blades and cooperating rotary cutting blades for mowing the grass as the machine is manually propelled over the ground.

Amongst the principal desiderata of the invention is to so construct a lawn mower wherein a clean cut of the grass may be effected adjacent shrubberies, walks, copings, or other permanent obstructions upon a lawn and one in which the cutting blades thereof are adjustable to and from the ground in order that the grass may be cut at various desired heights.

Still another object of the invention is to provide a lawn mower wherein the grass to be cut will be drawn within the cutting blades and the latter performing a shearing action thereupon, whereby all the grass over which the machine passes will be evenly mowed.

With the above and other objects in view, the invention may be said to consist of a manually propelled machine having stationary fingers extending radially about a circular base plate of the machine, each finger having a cutting edge, which are crossed by the opposed rotary motor driven cutting blades in order that the latter may draw the grass to be cut between the fingers and cut the same by a shearing action. Other novel features of construction, combination and arrangement of parts, will be hereinafter more fully described and particularly pointed out in the accompanying drawings, in which:

Figure 1 is a top plan view of the lawn mower embodying the present invention;

Figure 2 is a side elevation of the same;

Figure 3 is an enlarged front elevation of the machine;

Figure 4 is a vertical section taken on the line 4—4 of Figure 2 in the direction of the arrow points;

Figure 5 is a detail view taken on the line 5—5 of Figure 1 in the direction of the arrow points;

Figure 6 is a bottom plan view of the rotary frame, and

Figure 7 is a detail sectional view taken through the rotary frame for illustrating the manner of connecting a cutting blade thereto.

Referring now more particularly to the accompanying drawings, wherein like corresponding parts are designated by similar reference characters throughout the several views, the lawn mower herein shown comprises a manually propelled wheeled supported frame having arranged thereupon, power driven rotary cutting blades and the frame thereof consists of a U-shaped bar 1 which is to be adjustably suspended between the ground wheels 6. The vertical end portions 2 of this bar 1 are each provided with an elongated slot 3 through which extends a suitable stub axle or bolt 5. Each bolt or stub axle 5 is provided with a bushing 4 in order that a ground wheel 6 may revolve thereupon. These bushings 4 are arranged between the head of the bolt 5 and the vertically extending side arms 2 of the bar 1 and in Figure 4 of the drawings, it will be noted that each bushing is slightly longer than the width of the hub of the wheel journaled thereupon. Each bolt 5 is also provided with a washer and adjustable nut 8 which is arranged upon the inner face of the vertical side arm 2 so that through the adjustment of this nut 8 a rigid connection may be established between the wheels 6 and the bar 1, but yet permitting the wheels to freely revolve upon their respective bushings or sleeves 4. Suitable adjusting screws 9 are provided within the elongated slots 3 of the side arms 2 and rest upon the axle 5 as is better shown in Figures 4 and 5 of the drawings. By loosening the nuts 8, the U-shaped frame 1 may be vertically adjusted to the desired height above the ground over which the machine travels, in order that through this adjustment, the grass may be mowed at various heights.

A substantially circular base plate 10 is secured and arranged horizontally upon the medial portion of this U-shaped bar 1 and supported upon this base plate, adjacent its rear end is a motor 13, which is herein shown as an electric motor, but it is, of course, to be understood that a gasoline engine or other prime mover may be substituted therefor. The forward end of this base plate projects beyond the ground wheels 6 in the manner as is better illustrated in Figures 1 and 2 of the drawings, and this forward projecting portion of the base plate has formed therein a plurality of triangular shaped fingers 14 which are arranged in a semi-circular fashion and the base portions of these triangular shaped fingers are positioned toward the center of the base plate. Cutting edges 15 are formed integral with each finger along one side thereof and it is to be herein noted that these cutting edges 15 extend at oblique angles with regard to imaginary radial lines drawn from the center of the circular base plate 10 to the outer or apex ends of the fingers 14. Whereas I have herein shown these cutting edges 15 being formed integral with each finger, it is, of course, to be understood, that detachable cutting blades may be substituted therefor and secured to each finger in order that the cutting blades may be removed and re-sharpened when they have become dull.

Adapted to cooperate with these fingers and the cutting edges 15 thereof, are rotary cutting blades 16, each of which latter consists of a plate having a cutting edge arranged along one side thereof. These cutting blades are detachably and adjustably connected to the outer angular extensions 17 formed with the outer ends of the radially extending bars 19 forming a part of a rotary frame to be later described. Extending through each angular extension 17 are fastening bolts 19', which form a means of connection between the rear sides of the cutting blades 16 to the rotary frame and the opposite or cutting edges 17 of these blades may be adjusted to and from the stationary cutting fingers 14 by means of the set screws 20.

This rotary frame comprises a bearing sleeve 21 having formed with its lower end, the radially extending arms 19, preferably four in number, and formed with the opposite or upper end of this bearing sleeve 21 is a bevel gear 22. A spindle 23 is formed with the base plate 10 and extends through this bearing sleeve 21 in order that the rotary frame may be rotatably supported upon the base plate 10. The base plate 10 has also positioned thereupon, an annular bearing ring 24 upon which is adapted to ride, a similar bearing ring 25 secured to the arms 19 of the rotary frame. If it is desired, a suitable ball bearing raceway may be positioned between the bearing rings 24 and 25 or any other suitable support may be arranged upon the base plate 10 for permitting the travel of the rotary frame thereupon, as may come within the scope of the present invention.

The armature shaft 26 of the electric motor 13 as herein shown has keyed thereto, a bevel gear 27 which is in mesh with the bevel gear 22 in order that upon rotation of the armature shaft, the rotary frame will be caused to revolve whereat the cutting blades 16 will pass over the radially extending fingers 14 in order that the cutting edges of the blades 16 and the cutting edges 15 of these fingers may coincide to perform a shearing action upon the grass passing therebetween.

A U-shaped bar 28 has its opposite end connected to the rearward portion of the base plate 10 in order to provide a handle whereby the machine may be manually propelled over the ground and positioned upon this handle, is a suitable cord conductor leading to the electric motor 13. Arranged within this handle 28 is a suitable switch 30 whereby the flow of electrical energy through the cord conductor to the motor 13 may be controlled by the operator who is propelling the machine over the ground.

Secured to the opposite sides of the bar 28 formed in the handle, are brackets 11, having journaled therein a roller 12, which latter provides a support for the frame and retains the plate 10 as well as the cutting blades supported thereupon in a position substantially parallel to that of the ground over which the machine travels.

From the foregoing, it is obvious that by constructing a lawn mower in the manner as aforesaid, the set screws 9 may be adjusted whereat the base plate 10 will be positioned at the desired height upon the ground or lawn having grass to be cut and that the roller 12 will retain the base plate 10 in the desired horizontal position in order that an even clean cut of the grass will be effected as the machine passes thereover. The motor 13 being set in motion will cause the rotary frame to revolve whereat the angular extensions 17 carried by this rotary frame will have a tendency to draw the grass between the various fingers 14 and any grass caught between these fingers will be subjected to a shearing action by means of the cutting edges formed with the blade 16 and the fingers 14. Furthermore, it will be noted that by projecting these fingers 14 beyond the supporting wheel 6 of the machine, that they may be positioned close to shrubberies, walks, copings or other obstructions arranged upon a lawn to be cut, in order that the edges of the lawn, around such obstructions, may be cut without the necessity of trimming the edges of the lawn after the grass has been mowed. As the power to the rotary blades of this machine is transmitted thereto by a motor positioned upon the base plate 10 and such power is not dependent upon the propulsion of the machine over the ground, this mower may be moved closely adjacent such obstructions upon a lawn and power transmitted to the rotary blades, whereat all grass positioned within the fingers 14 may be readily cut.

Manifestly, the construction shown is capable of considerable modification, and such modification as is within the spirit of our claims we consider within the spirit of our invention.

We claim:—

1. A lawn mower comprising a pair of spaced ground wheels, a stub shaft for each wheel, a U-shaped bar suspended between said ground wheels and adjustably connected to said stub shafts, a horizontally disposed and substantially circular base plate secured to said bar, radially extending fingers each having a cutting edge formed with said base plate and extending beyond said ground wheels, a vertically positioned spindle formed with said base plate, a rotary frame mounted upon said spindle, radially extending arms formed with said rotary frame, angular extensions formed with the outer end of each arm, a cutting blade carried by each angular extension and adapted to cooperate with the cutting edges of said fingers, a bearing ring mounted upon said base plate, a second bearing ring carried by said arm of the rotary frame and adapted to ride upon the first mentioned bearing ring, a motor mounted upon said base plate and operatively connected to said rotary frame, a castor wheel for supporting the rear end of said base plate, and a handle secured to the rear portion of said base plate whereby the machine may be manually propelled over the ground.

2. A lawn mower comprising a pair of spaced ground wheels, a stub shaft for each wheel, a frame suspended between said ground wheels and adjustably connected to said stub shafts, a horizontally disposed base plate secured to said frame, fingers formed with the forward end of said base plate and each having a cutting edge, a motor secured to and supported by the rear end of said base plate, a spindle secured to and projecting from said base plate, a rotary frame mounted upon said spindle, cutting blades secured to and carried by said rotary frame and adapted to co-operate with the cutting edges of said fingers, means for operatively connecting the upper end of said rotary frame to said motor mounted upon the base plate, a castor wheel supporting the rear end of said base plate, and a handle secured to the rear portion of said base plate whereby the machine may be manually propelled over the ground.

In witness whereof we have hereunto set our hands.

WILLIAM J. ROSSITER.
JAMES N. WILKING.